T. F. FITZGERALD.
WATER GAGE.
APPLICATION FILED JULY 22, 1910.
1,000,394.
Patented Aug. 15, 1911.
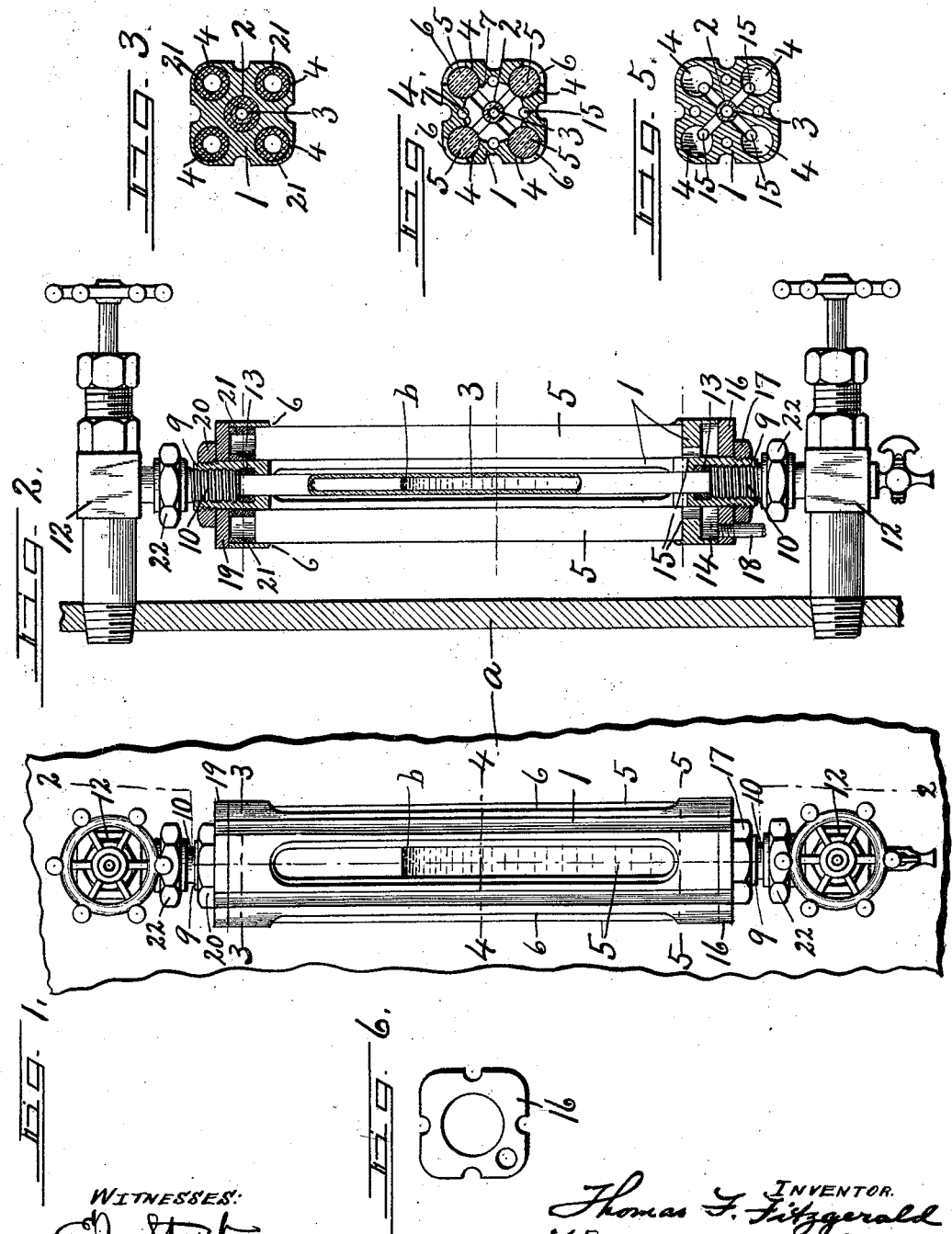

UNITED STATES PATENT OFFICE.

THOMAS F. FITZGERALD, OF SYRACUSE, NEW YORK.

WATER-GAGE.

1,000,394.

Specification of Letters Patent.  Patented Aug. 15, 1911.

Application filed July 22, 1910. Serial No. 573,199.

*To all whom it may concern:*

Be it known that I, THOMAS F. FITZ-GERALD, of No. 182 Holland street, Syracuse, in the county of Onondaga, in the State of New York, have invented new and useful Improvements in Water-Gages, of which the following, taken in connection with the accompanying drawings, is a full, clear, and exact description.

This invention relates to certain improvements in water gages of the tubular sight-glass type for steam boilers and refers more particularly to means for shielding, guarding and protecting the engineer and fireman from injury by flying glass, escaping steam, or hot water, resulting from the breaking of the water glass. These water glasses are particularly dangerous when used in connection with high pressure boilers, such as locomotives, where the engineer and fireman are necessarily confined within a very small space and in close proximity to the boiler without any possibility of avoiding the escaping steam and hot water as well as the flying glass in case of breakage of the gage. Furthermore, aside from the loss of sight and other disabilities resulting from such accidents, is the large contingent expense in payment of liabilities or assessed damages to the injured party.

My object, therefore, is to equip the gage frame with a plurality of round glass bars of clear quality, running parallel with the gage and associated with the frame in such manner as to entirely inclose the water tube and thereby effectively protect the engineer and fireman from injury in case the glass gage should break.

Another object in employing the round glass bars is to magnify the column of water in the tube so that the water level in the boiler as indicated in the tube may be seen at a greater distance, or with greater clearness.

A further object is to provide means whereby the escaping steam, hot water, and glass may be diverted downwardly through suitable vent openings, in case of breakage of the glass tube, so that the engineer or fireman may readily close the valves connecting the gage to the boiler and speedily repair or replace the broken glass without liability of injury.

Other objects and uses will be brought out in the following description.

In the drawings: Figure 1 is a front elevation of my improved water gage and adjacent portion of a steam boiler to which it is connected. Fig. 2 is a longitudinal sectional view on line 2—2, Fig. 1, partly in elevation, of the same gage, showing also an adjacent portion of the steam boiler in section. Figs. 3, 4, and 5, are horizontal views taken respectively on lines 3—3, 4—4, and 5—5, Fig. 1. Fig. 6 is a top plan of one of the lower end caps or covers for the vent pocket or compartment in the shield and glass supporting frame.

This combined water gage and shield comprises an upright elongated metal frame —1— having a central lengthwise opening —2— for receiving the usual water glass —3— and also provided with a plurality of, in this instance four, additional lengthwise openings —4— for receiving a corresponding number of upright cylindrical glass rods —5— preferably of greater diameter than that of the water tube —3—.

The openings —4— and glass rods —5— are arranged equi-distant apart around and some distance from the water gage —3—, the glass rods —5— being of nearly the same length as the water glass and of clear tenacious quality so that the water in the glass tube —3— may be readily visible therethrough, and somewhat magnified thereby, at the same time such rods are capable of withstanding any pressure to which they may be subjected from escaping steam and water in case of breakage of the glass tube.

Portions of the frame —1— at the inner and outer sides of the openings —4— are cutaway at —6— and 7 throughout the greater portion of their lengths between the ends thereof, but terminating short of the ends of the glass rods —5— thus leaving the ends of said glass bars entirely inclosed, the cutaway portions —6— and —7— forming sight openings to afford clear vision through the glass rods to the water tube to enable the engineer or fireman to determine the level of the water in the boiler.

The rotundity of the cylindrical glass rods —5—, which, in this instance, are solid, serves to visually magnify the water in the tube —3— thereby permitting such water to be seen at a greater distance than would be possible without this magnifying medium.

The frame —1— is substantially rectangular or square in cross section and the cylindrical rods —5— are preferably arranged at the four corners thereof, so as to permit the water gage to be visible from any point of view.

The ends of the central opening —2— in which the water glass is seated are of substantially the same diameter as the tube, leaving just sufficient clearance for the tube to be inserted into or removed from the frame, the greater portion of the opening between the ends of the water tube being enlarged and communicating with the openings 4 through the sight openings —7— at the inner sides of the glass rods —5—.

The opposite ends of the frame —1— are also provided with reduced nipples —9— which are preferably threaded internally and exernally, the internal threads receiving the nipples —10— of lower and upper valve casings —12—, which are tapped into the boiler —a— above and below the water level, indicated at —b— in the water tube —3—.

Suitable gaskets —13— are interposed between the nipples —10— and bases of the threaded extensions —9— and around the opposite ends of the water tube —3— to prevent leakage of steam or water at these joints.

The lower end of the frame —1— is provided with a vent chamber —14— surrounding the tubular extension —9— and communicating with the interior of the frame in which the water glass is located through one or more, in this instance a plurality of, openings —15— to permit the downward escape of steam and hot water, as well as broken glass in case of breakage of the water tube.

The lower end of the chamber —14— is covered by cap —16— held in place by a nut —17—, which is screwed upon the external threads of the tubular extension —9—, said cap or cover —16— being provided with a vent opening adapted to be connected to a vent pipe —18— which may lead to the exterior of the cab or to any other locality where the discharge of the steam and hot water would not expose the engineer or fireman to injury, and at the same time permitting the valves —12— to be closed with perfect safety.

The openings —4— in which the glass rods —5— are arranged are closed at the bottom and open at the top to permit their insertion and removal, but when in operative position the open upper ends are closed by a suitable cap —19— which is held in place by a nut —20— engaged with the external threads of the upper tubular extension —9—.

The lower ends of the glass rods —5— are therefore seated in the lower ends of their respective openings and their upper portions are held against endwise movement by yielding members —21— of rubber or other resilient material interposed between the upper ends of the bars —5— and the cap —19— to yieldingly hold such glass bars against upward displacement and at the same time allow a limited lengthwise expansion and contraction without liability of overstraining any of the parts or loosening the joints. These glass rods —5— are fitted with a reasonably tight sliding fit in their respective openings, so that they, together with the frame —1—, effectively prevent the escape of steam, water or glass, except through the channels provided therefor in case of breakage of the water tube.

The connections between the opposite ends of the frame —1— and valve casings —12— are made through the medium of pipe unions —22— which permits the frame —1— with the water tube and glass bars —5— therein to be readily removed or replaced when the valves in the casings —12— are closed.

It will be seen from the foregoing description that the entire shield, consisting of the frame —1— and cylindrical glass bars —5—, constitute a unitary article of manufacture, adapted to be used with any of the standard connections or glass water tubes.

When the device is placed in operative position for use and the glass tube —3— is broken from any cause, the frame —1— and its glass shield bars —5— effectively confine the steam, water and broken glass within the inner enlarged chamber —8— and allow it to gradually discharge therefrom through the passage —15— into the chamber —14— and thence downwardly and outwardly through the vent pipe —18— thereby removing any possibility of danger to the engineer or fireman and permitting either of them to readily approach and close the valves in the casings —12— to permit replacement of a new water glass. This may be accomplished by simply disconnecting one of the unions —22— and swinging the disconnected end of the frame —1— laterally sufficient to permit the removal of the broken water tube and reinsertion of a new one, after which the frame —1— may be returned to its normal position and reconnected by its previously detached union, this operation requiring but a few minutes, whereupon the valves may be reopened to again connect the water tube with the boiler.

What I claim is:

1. A water-gage comprising an upright metal frame having communicating upright openings, a water glass in one opening, and a cylindrical glass rod in the other opening, said frame having a portion of one side cut away to expose the corresponding side of the glass bar.

2. A shield for glass water gage tubes comprising a frame surrounding the tube and provided with vertically elongated sight openings, and round glass rods arranged in said openings.

3. A water-gage comprising a glass water tube, a frame inclosing said tube and provided with a plurality of sight openings, and cylindrical glass rods fitted in the openings.

4. A water-gage comprising a frame having a central lengthwise opening and a series of upright sight openings arranged about the central opening, a glass water tube in the central opening and cylindrical glass rods fitted in the sight openings and forming with the frame a shield entirely surrounding the glass tube.

5. A shield for glass water-gage tubes comprising a frame having a sight opening, and a glass rod fitted in said opening and provided with a convex outer face to visually magnify the water in the tube.

6. A shield for glass water-gage tubes comprising a frame having a sight opening, and a glass rod fitted in said opening and provided with outer and inner convex faces to visually magnify the water in the tube.

7. A shield for glass water-gage tubes comprising a frame having a central opening for the water tube and a series of sight openings arranged around the central opening, and glass rods fitted in the sight openings and having inner convex faces facing the water tube.

8. A water-gage for steam boilers comprising a one-piece hollow metal frame having a chamber in its bottom communicating with the interior thereof, said frame being provided with lengthwise sight openings, a glass water tube within the hollow frame, cylindrical rods fitted in the sight openings, and a vent pipe leading from said chamber.

In witness whereof I have hereunto set my hand this 14th day of July 1910.

THOMAS F. FITZGERALD.

Witnesses:
H. E. CHASE,
PERSIS PHYLLIS PARKS.

---

Copies of this patent may be obtained for five cents each, by addressing the "Commissioner of Patents, Washington, D. C."